United States Patent
Arnold et al.

(10) Patent No.: US 7,752,182 B1
(45) Date of Patent: *Jul. 6, 2010

(54) PORTABLE ELECTRONIC DEVICE FILTERING

(75) Inventors: Greg Arnold, Sunnyvale, CA (US); Fermin Soriano, Sunnyvale, CA (US)

(73) Assignee: Palm, Inc., Sunnyvale, CA (US)

( * ) Notice: Subject to any disclaimer, the term of this patent is extended or adjusted under 35 U.S.C. 154(b) by 13 days.

This patent is subject to a terminal disclaimer.

(21) Appl. No.: 11/714,677

(22) Filed: Mar. 5, 2007

Related U.S. Application Data

(63) Continuation of application No. 10/080,008, filed on Feb. 20, 2002, now Pat. No. 7,203,681.

(51) Int. Cl.
*G06F 17/30* (2006.01)
(52) U.S. Cl. ..................................................... 707/692
(58) Field of Classification Search ..................... 707/2, 707/10, 692; 713/188
See application file for complete search history.

(56) References Cited

U.S. PATENT DOCUMENTS

| | | | |
|---|---|---|---|
| 5,721,825 A | 2/1998 | Lawson et al. | |
| 6,219,047 B1 * | 4/2001 | Bell | ........................... 715/705 |
| 6,496,979 B1 | 12/2002 | Chen et al. | |
| 6,721,880 B1 | 4/2004 | Pike | |
| 6,842,861 B1 * | 1/2005 | Cox et al. | ................... 713/188 |
| 7,085,934 B1 * | 8/2006 | Edwards | ...................... 726/24 |
| 2002/0123992 A1 | 5/2002 | Goldick | |
| 2003/0017805 A1 | 1/2003 | Yeung et al. | |
| 2003/0033536 A1 * | 2/2003 | Pak et al. | .................... 713/188 |
| 2003/0079145 A1 | 4/2003 | Kouznetsov et al. | |

* cited by examiner

*Primary Examiner*—Etienne P LeRoux

(57) ABSTRACT

A filtering method and apparatus for a portable electronic device such as a palmtop computer. The operating system's program registry is copied and then modified to direct all application data to a filter program such as a virus scanning filter program. If the filter program determines that the object is virus free, the copy of the program registry (filter registry) is queried by the filter program to determine the application program associated with the data object. The data object is then forwarded to the appropriate application program.

17 Claims, 6 Drawing Sheets

PORTABLE ELECTRONIC DEVICE FILTERING

RELATED APPLICATION

This is a Continuation Application of commonly owned U.S. patent application Ser. No. 10/080,008, now U.S. Pat. No. 7,203,681, entitled "Hand Held Device Filtering," filed Feb. 20, 2002, to Arnold and Soriano, which is hereby incorporated herein by reference in its entirety.

FIELD OF INVENTION

The present invention relates to the field of palmtop computers and similar portable electronic devices. More particularly, one embodiment of the present invention relates to virus protection for such portable electronic devices.

BACKGROUND

As the components required to build a computer system have reduced in size, new categories of computer systems have emerged. One of the new categories of computer systems is the "palmtop" computer system. A palmtop computer system is a computer that is small enough to be held in the hand of a user and can be "palm-sized." Most portable electronic systems are used to implement various Personal Information Management (PIM) applications such as an address book, a daily organizer and electronic notepads, to name a few. Such palmtop computers are currently commercially available in the form of Personal Digital Assistants (PDAs) as well as other forms such as portable telephones and the like.

When the operating systems for such devices (e.g., the Palm™ operating system) were originally developed, such devices were standalone personal information managers that were used with little or no information exchanged with other devices (excluding perhaps a host computer). As the devices evolved, greater interactivity was developed so that the devices can more easily communicate with outside sources of data such as the Internet, Email, infrared communication, etc. As such interactivity becomes more commonplace, the vulnerability of portable electronic devices to attacks by viruses increases. Such attacks may not have been initially contemplated in the original design of the operating system, so a mechanism for filtering out viruses is not built in.

Portable electronic devices capable of receiving data from an external source (IR port, serial port, modem card, etc) generally keep a registry of device applications and the type of data objects they support. (This registry is called the registry in the Palm operating system, by Palm Computing, Inc., Santa Clara, Calif. and is accessed by the Exchange Manager software. Similar functions are carried out by the ShellExecute function in Microsoft Corporation's (Redmond, Wash.) Windows CE™ as well as in certain web browser programs such as Microsoft Corporation's Pocket Internet Explorer™. These functions similarly access a registry-like file to determine program associations and are considered equivalent for purposes of the present invention.) This registry is used to determine which application(s) will process the incoming data object. The normal process used to associate data objects with applications is illustrated in FIG. 1.

When an incoming data object 20 is received by a portable electronic device such as 24, the Exchange Manager (or equivalent software) determines which application is associated with the data object at 28 by reference to a registry 32. The registry, in part, forms a database of data types and the application with which the particular data type is associated. Once the data type is identified as associated with a particular application, the data object is forwarded the designated application 36.

Under this arrangement, a portable electronic device can easily be infected by a virus since there is no good mechanism for intercepting the virus within an incoming data object before the virus reaches the target application.

SUMMARY OF THE INVENTION

Accordingly, what is needed is a mechanism for filtering out viruses and carrying out other filtering operation that can be used in conjunction with portable electronic device operating systems.

In accordance with certain embodiments of the invention, a filtering method and apparatus for a portable electronic device such as a palmtop computer is provided. The operating system's program registry is copied and then modified to direct all application data to a filter program such as a virus scanning filter program. If the filter program determines that the object is virus free, the copy of the program registry (filter registry) is queried by the filter program to determine the application program associated with the data object. The data object is then forwarded to the appropriate application program. This provides the advantage of being able to implement filtering programs within the framework of existing operating systems that currently exhibit vulnerability to virus infection and also provides a mechanism for other filtering programs such as use monitoring.

A method consistent with certain embodiments of the present invention, of filtering data objects in a portable electronic device, includes receiving a data object at the portable electronic device; referencing a program registry to determine an application program associated with the data object, wherein the program registry designates that all data objects are associated with a filter program; carrying out a filtering operation on the data object at the filter program; determining from a filter registry which application program is associated with the data object; and directing the data object to the application program.

A method consistent with certain embodiments of the present invention, of virus filtering data objects in a portable electronic device, includes receiving a data object at the portable electronic device; referencing a program registry to determine an application program associated with the data object, wherein the program registry designates that all data objects are associated with a filter program; carrying out a virus scan filtering operation on the data object at the filter program; in the event a virus is detected: taking a virus infection avoidance action; and in the event a virus is not detected: determining from a filter registry which application program is associated with the data object, and directing the data object to the application program.

A portable electronic device, consistent with certain embodiments of the present invention has a processor. An input circuit receives a data object destined for the portable electronic device. A program registry designates that all data objects received are associated with a filter program. An exchange manager program determines which application is associated with a data object by referencing the program registry. The filtering program runs on the processor and carries out a filtering operation on the received data object. A filter registry associates application programs with data objects. The filter program determines from the filter registry which application program is associated with a received data object and directs the data object to the application program.

A portable electronic device, consistent with certain embodiments of the present invention, has a processor. An input circuit receives a data object destined for the portable electronic device. A program registry designates that all data objects received are associated with a filter program. An exchange manager program determines which application is associated with a data object by referencing the program registry. The filtering program runs on the processor and carries out a virus scan filtering operation on the received data object. A filter registry associates application programs with data objects, wherein the filter program determines from the filter registry which application program is associated with a received data object and directs the data object to the application program. In the event a virus is detected in the filtering operation, the filter program further takes a virus infection avoidance action.

The above summaries are intended to illustrate exemplary embodiments of the invention, which will be best understood in conjunction with the detailed description to follow, and are not intended to limit the scope of the appended claims.

BRIEF DESCRIPTION OF THE DRAWINGS

The accompanying drawings, which are incorporated in and form a part of this specification, illustrate embodiments of the invention and, together with the description, serve to explain the principles of the invention. Unless otherwise noted, the drawings are not drawn to scale.

DETAILED DESCRIPTION

Figure 1:
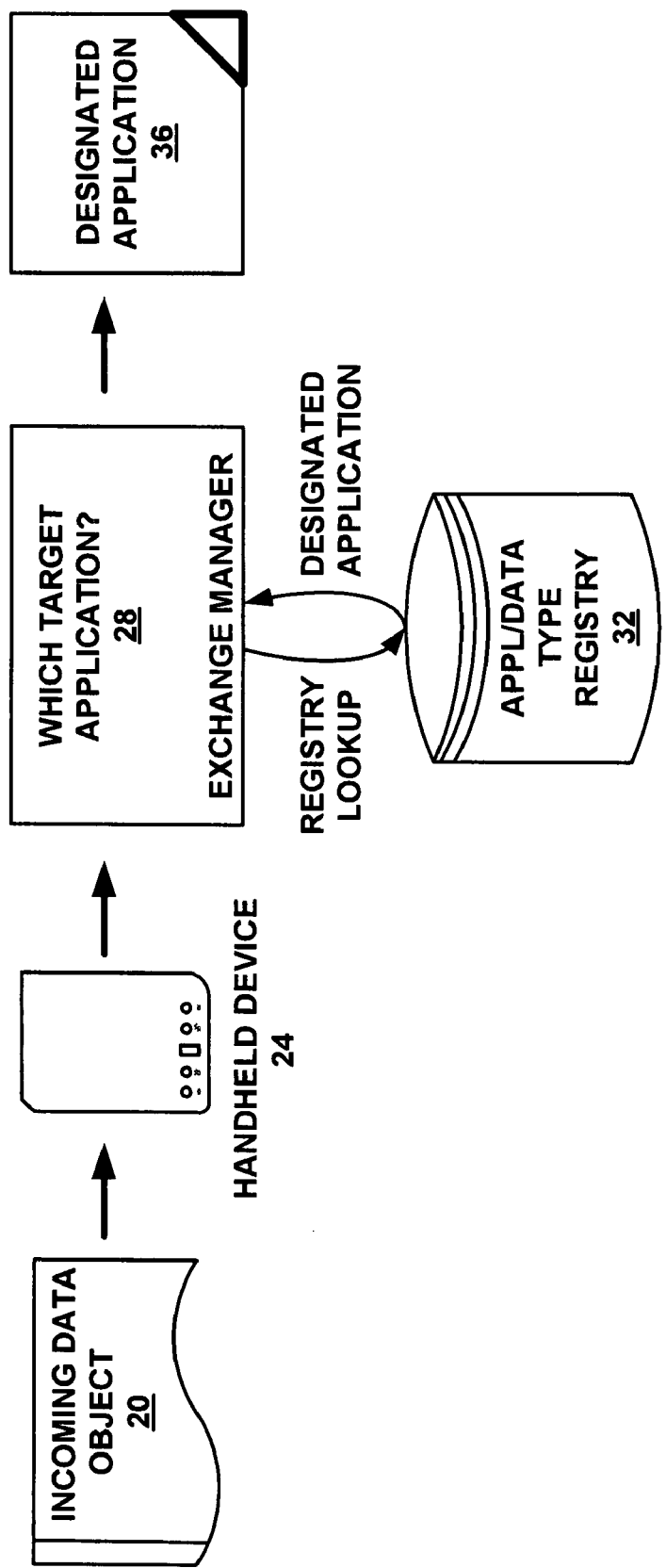
FIG. 1 illustrates the normal mechanism used to associate an incoming data object with an application in a portable electronic device.

Reference will now be made in detail to various embodiments of the invention, a reusable image bearing surface and method of modifying memory contents related to same, examples of which are illustrated in the accompanying drawings. While the invention will be described in conjunction with these embodiments, it is understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the invention, numerous specific details are set forth in order to provide a thorough understanding of the invention. However, it will be recognized by one of ordinary skill in the art that the invention may be practiced without these specific details. In other instances, well known methods, procedures, components, and circuits have not been described in detail as not to unnecessarily obscure aspects of the invention.

Notation and Nomenclature

Some portions of the detailed descriptions which follow (e.g., process 300) are presented in terms of procedures, steps, logic blocks, processing, and other symbolic representations of operations on data bits that can be performed on computer memory. These descriptions and representations are the means used by those skilled in the data processing arts to most effectively convey the substance of their work to others skilled in the art. A procedure, computer executed step, logic block, process, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "detecting" or "referencing" or "installing" or "modifying" or "updating" or "determining" or "copying" or "receiving" or "stopping" or "suspending" or "receiving" or "adding" or "removing" or "executing" or "continuing" or "indexing" or "processing" or "computing" or "translating" or "calculating" or "determining" or "scrolling" or "displaying" or "recognizing" or "generating" or "changing" or "measuring" or "gathering" or "running" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Portable Electronic Device Filtering in Accordance with the Present Invention

While this invention is susceptible of embodiment in many different forms, there is shown in the drawings and will herein be described in detail specific embodiments, with the understanding that the present disclosure is to be considered as an example of the principles of the invention and not intended to limit the invention to the specific embodiments shown and described. In the description below, like reference numerals are used to describe the same, similar or corresponding parts in the several views of the drawings.

Figure 2:
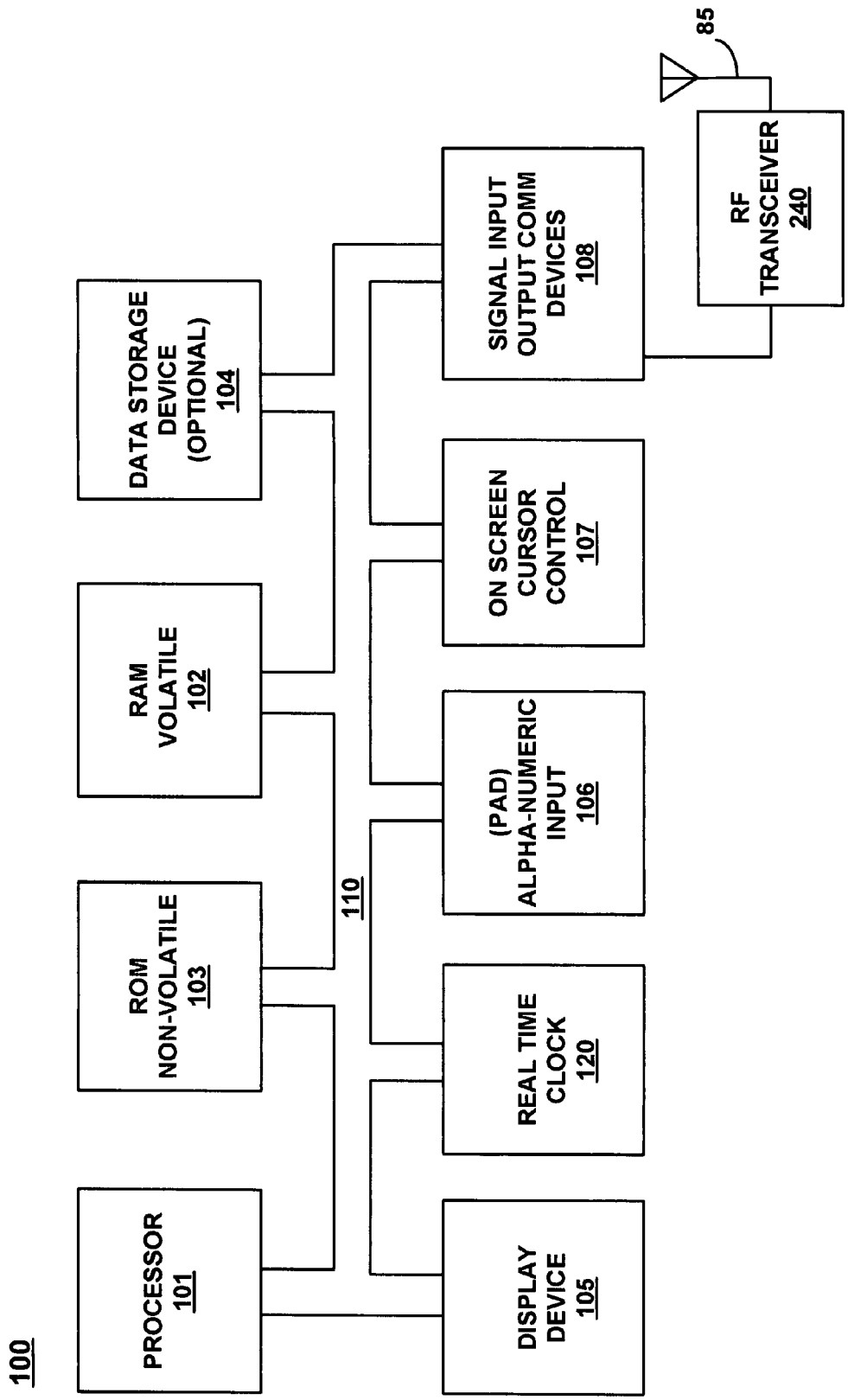
FIG. 2 is a logical block diagram of a palmtop computer system or other portable electronic device in accordance with an embodiment of the present invention.

FIG. 2 illustrates circuitry of computer system 100, some of which can be implemented within a portable electronic device such as 24 and similar devices consistent with the present invention. Examples of such portable electronic devices are commercially available from Palm Computing, Inc., 5470 Great America Parkway, Santa Clara, Calif. 95054. Computer system 100 includes an address/data bus 110 for communicating information, a central processor 101 coupled with the bus for processing information and instructions, a volatile memory 102 (e.g., random access memory RAM) coupled with the bus 110 for storing information and instructions for the central processor 101 and a non-volatile memory 103 (e.g., read only memory ROM) coupled with the bus 110 for storing static information and instructions for the processor 101. Computer system 100 also includes an optional data storage device 104 (e.g., memory stick, SD memory, etc.) coupled with the bus 100 for storing information and instructions. Device 104 can be removable. As described above, system 100 also contains a display device 105 coupled to the bus 110 for displaying information to the computer user. The display device 105 is generally of limited resolution of M×N pixels—limited primarily by the size of the portable electronic device.

Also included in computer system 100 of FIG. 2 is an optional alphanumeric input device 106 which in one implementation is a handwriting recognition pad ("digitizer") having regions 106a and 106b (FIG. 2A), for instance. Device 106 can communicate information and command selections to the central processor 101. System 110 also includes an optional cursor control or directing device 107 coupled to the bus for communicating user input information and command selections to the central processor 101. In one implementation, device 107 is a touch screen device incorporated with screen 105. Device 107 is capable of registering a position on the screen 105 where the stylus makes contact. The display device 105 utilized with the computer system 110 may be a liquid crystal device, cathode ray tube (CRT), field emission device (FED, also called flat panel CRT) or other display device suitable for creating graphic images and alphanumeric characters recognizable to the user. In the preferred embodiment, display 105 is a flat panel display.

Signal communication device 108, also coupled to bus 110 in the illustrated embodiment, can be a serial port for communicating with a host computer through a cradle. Device 108 can also include an infrared communication port and an RF transceiver 240 for carrying out wireless communication through antenna 85. Operating system software or firmware, Email software or firmware as well as other software or firmware such as browser software or firmware can be stored in ROM 103 and/or RAM 102 and/or data storage device 104 along with so called "plug-ins".

Figure 3:
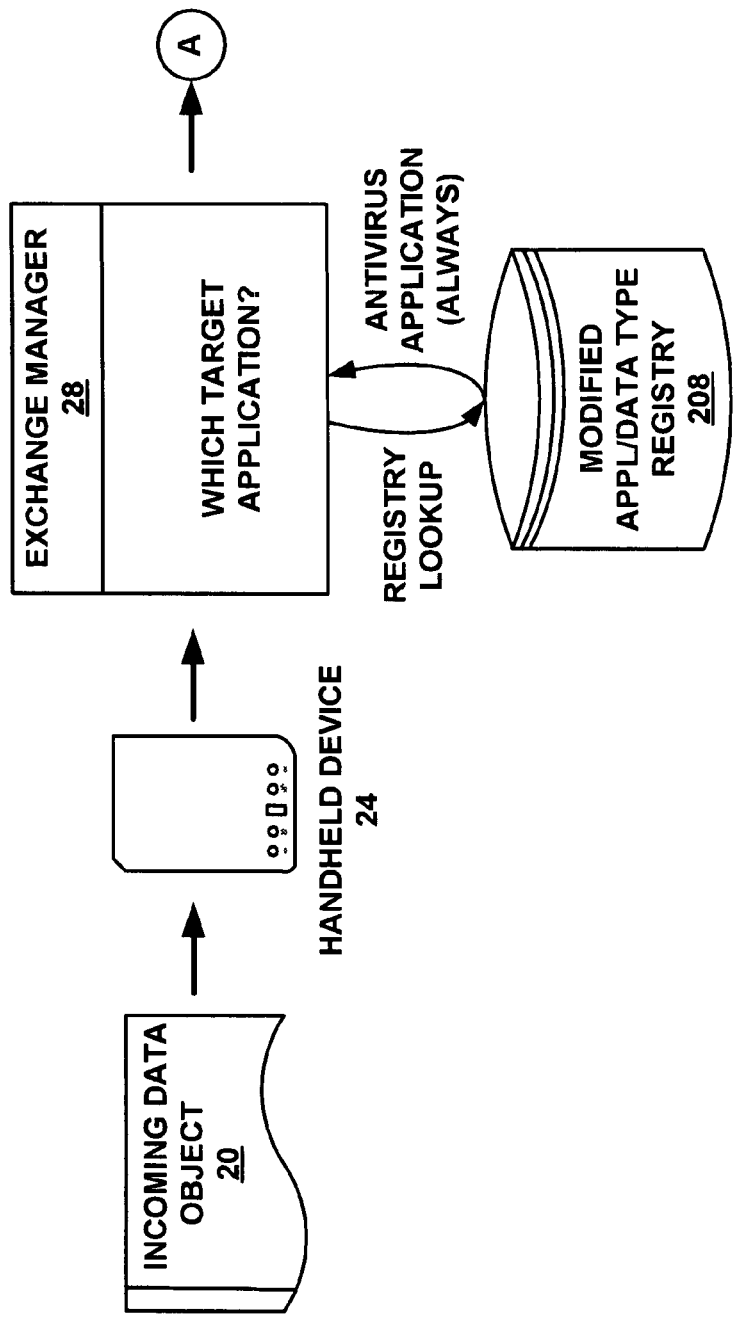
FIG. 3 illustrates a filtering application mechanism consistent with certain embodiments of the present invention.
Figure 3:
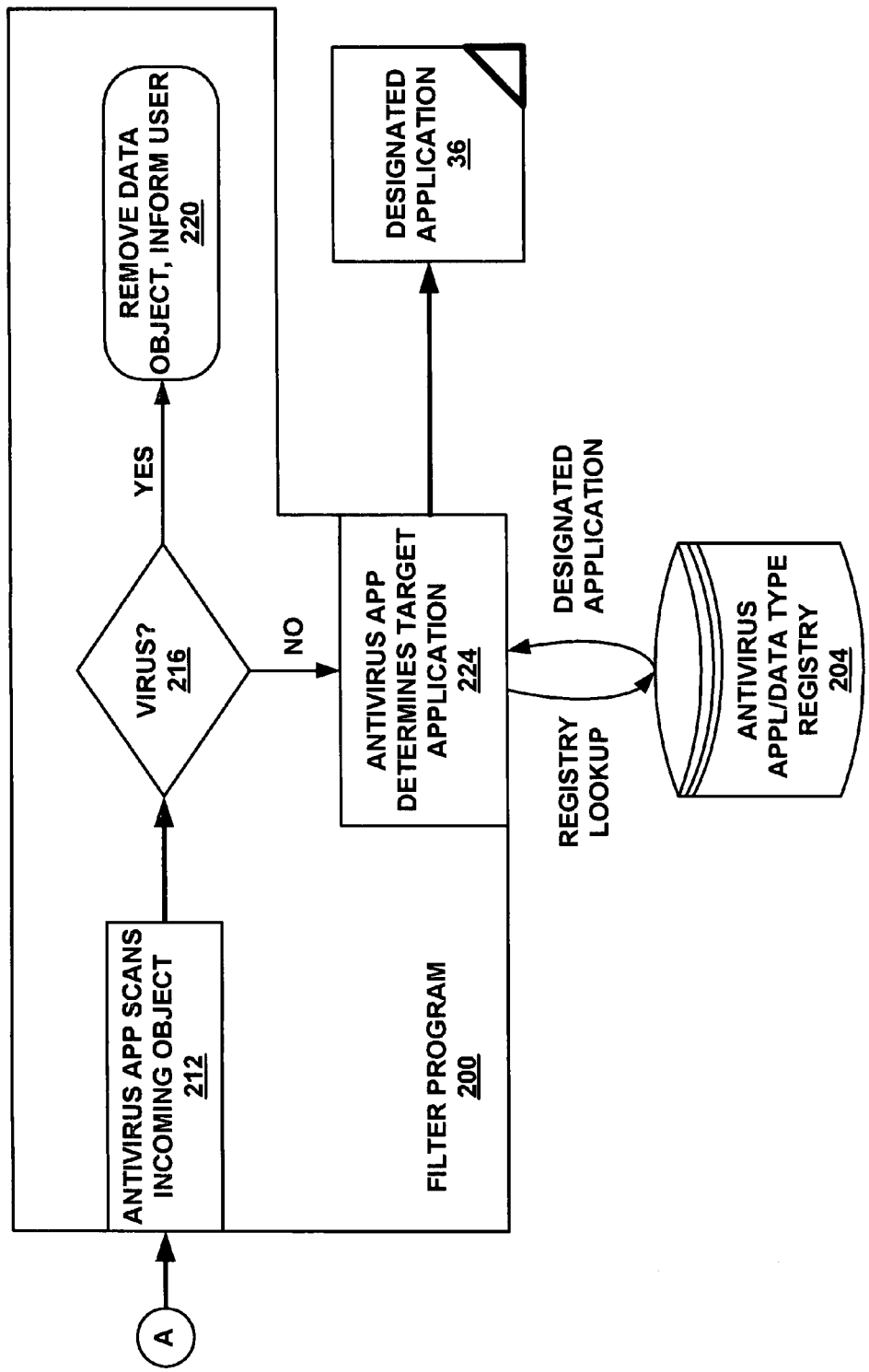

As described above, the portable electronic device 24 incorporating computer 100 may be susceptible to attack by a computer virus forming a part of an incoming data object 20. With reference to FIG. 3, illustrating an embodiment consistent with the present invention, a filter program 200 scans incoming data objects and attempt to avoid infection of the computer 100 with a virus. In this embodiment, a copy 208 of the existing registry is made to capture existing settings. The registry is then modified as registry 208 to associate all supported data types to a single filter application 200 that will handle the data received. By making this modification to the directory, the registry always returns the filter application 200 as a result (application association) of a query by the exchange manager 28. This filter application 200 thus initially receives all incoming data objects 20 and analyzes them at 212 to determine if they contain known viruses or other harmful content. If the data object is found to contain a known virus at 216, an appropriate action can be taken (e.g., remove data object and inform user at 220) to avoid infection of the computer 100.

When the incoming data object 20 has been processed and determined not to contain a virus, the filter application 200 determines from the copy of the registry 204 which device application is associated with the data object 20 at 224, and passes the data object 20 to the appropriate application 36 based on the information stored on the copy of the registry 204 made during installation. The filter application 200 monitors the portable electronic device's registry 208 to detect any modifications as a result of a new application installations and to take the appropriate action to capture the new settings in the registry copy 204 and to overwrite any new data object associations. This update process can be carried out in any suitable manner (including, but not limited to a complete reconstruction of the registry or editing of the registry) that will be evident to those skilled in the art.

In general, filter applications such as virus scanning filters utilize a database of virus definitions that are periodically updated. In order to permit this type of update, a particular data object type can be designated to permit the virus scanning filter to receive its own updates. Such updates can include, but are not limited to, updates for new viruses or worms, although the source and integrity of the updates should be carefully validated to avoid compromising the security of the portable electronic device. Other types of filters can similarly define specific data types that are used for updates.

Figure 4:
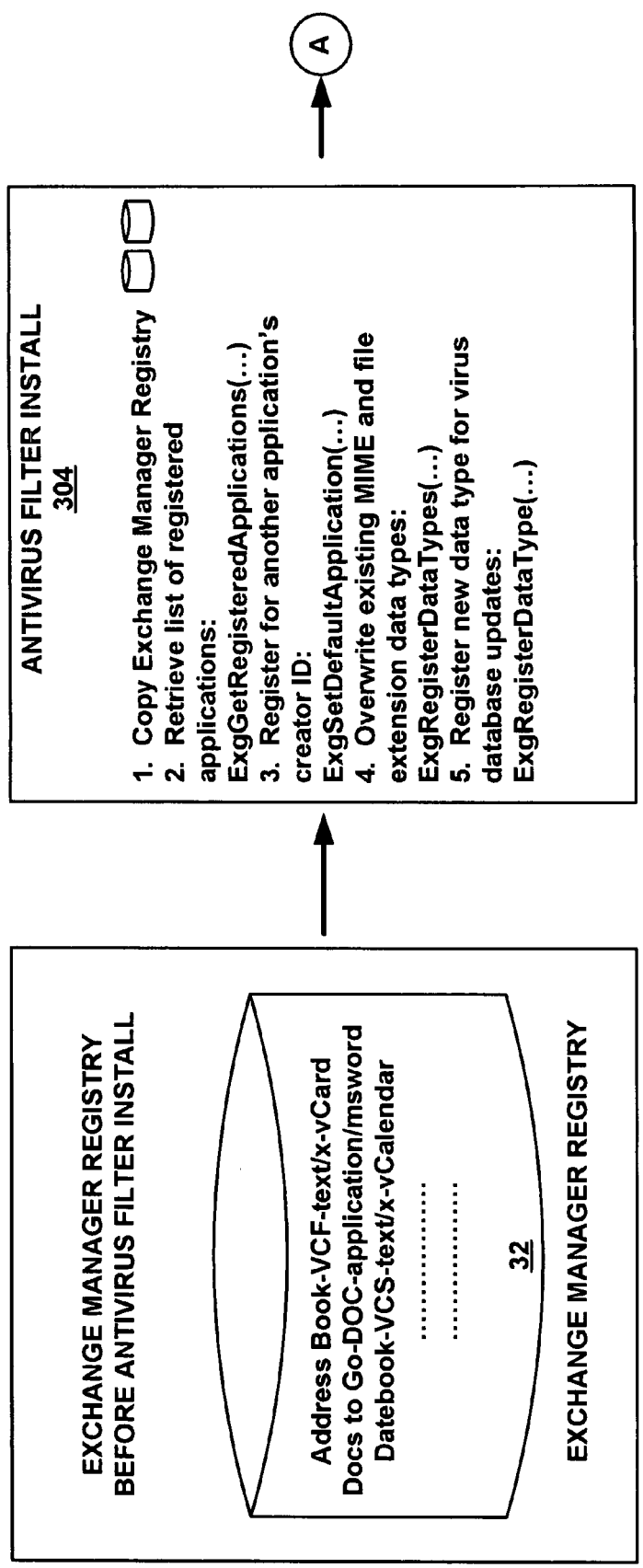
FIG. 4 shows a process for installation of a filtering application consistent with certain embodiments of the present invention.
Figure 4:
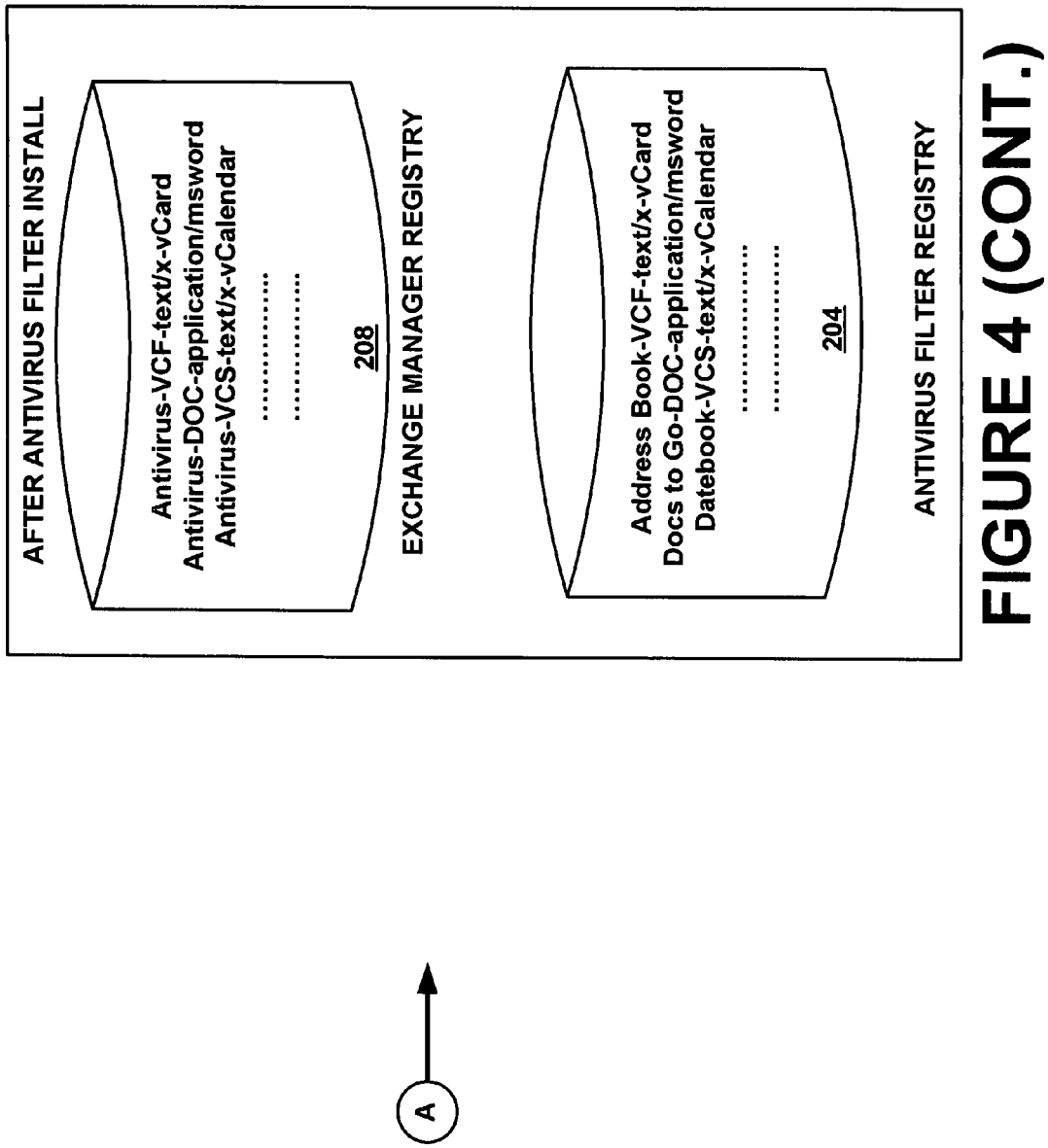

The changes made to the Exchange Manager's program registry are illustrated in FIG. 4. Considering, in particular, the Palm Operating System, version 3.x, the Exchange Manager is the interface used by Palm OS powered devices to send or receive data typed objects, as previously mentioned. The Exchange Manager maintains a registry of applications and the type of data they can receive (the program registry 32). The data coming into Exchange Manager contains a stream of information about its contents (header information). Exchange Manager determines which application handles the data by inspecting the header information. The header information can contain any or all of a Creator's ID, a MIME (Multipurpose Internet Mail Extension) type and a File extension. If the Creator's ID is specified, Exchange Manager uses that information to determine the target application. Otherwise it matches the provided MIME type or file extension with an appropriate default application stored in its program registry.

In order to provide a mechanism to examine all incoming data objects prior to being passed to the registered application, the copy of the Exchange Manager's program registry is made, as described above, to capture the existing application/data type mappings and becomes the filter registry 204. The program registry is then modified to associate all supported data types to a filter application 200 that handles the data received to become the new program registry 208.

To effect these changes, an installation process such as 304 (which is illustrated in connection with the Palm OS) is carried out to install the anti-virus filtering program as follows. The Palm's ExgRegisterDatatype function is called to associate existing MIME and file extension object types with the filter application. In some cases, the exchange socket structure of the incoming data object identifies a particular creator ID as the recipient for the data. To accommodate for this, the filter application takes advantage of the Palm's ExgSetDefaultApplication function, which allows an application to register for another application's creator ID.

After these changes have been made, the filter application 200 receives all incoming data objects 20 processed by the Exchange Manager. In the present implementation, this filter application 200 analyzes the data 20 received to determine if it contains known viruses or other harmful content and takes an appropriate action.

On Palm OS 4.0, the Exchange Manager allows the exchange library to turn off a confirmation dialog, making the Palm OS-powered device particularly vulnerable to this type of threat. Once the filter application has processed the incoming data, the copy of the Exchange Manager registry is used to determine the target application responsible for handling the received data object. New application installs can modify the Exchange Manager registry. At this writing, the Palm OS only allows one active application at the time. However, the Palm OS has a mechanism called launch codes by which all applications are informed whenever certain events take place, such as a Palm's HotSync operation (SysAppLaunchCmdSyncNotify in the Palm Operating System) or a system reset (sysAppLaunchCmdSystemReset in the Palm Operating System). In one embodiment consistent with the present invention, the filter application 200 takes advantage of these launch codes to detect Exchange Manager registry changes, update its registry database and modify the Exchange Manager registry to continue handling all incoming data objects.

A particular MIME type or extension can be associated with the filter application to receive its own updates such as updates for new viruses or worms. The source and integrity of the updates can be validated via existing object signing techniques or other techniques for verifying the integrity and source of the update.

Those skilled in the art will recognize that the present invention has been described in terms of exemplary embodiments based upon use of a programmed processor. However, the invention should not be so limited, since the present invention could be implemented using hardware component equivalents such as special purpose hardware and/or dedicated processors which are equivalents to the invention as described and claimed. Similarly, general purpose computers, microprocessor based computers, micro-controllers, optical computers, analog computers, dedicated processors and/or dedicated hard wired logic may be used to construct alternative equivalent embodiments of the present invention.

Those skilled in the art will also appreciate that the embodiments described above can be implemented using disc storage as well as other forms of storage including Read Only Memory (ROM) devices, Random Access Memory (RAM) devices; optical storage elements, magnetic storage elements, magneto-optical storage elements, flash memory, core memory and/or other equivalent storage technologies without departing from the present invention. Such alternative storage devices should be considered equivalents.

The present invention is preferably implemented using a programmed processor executing programming instructions that are broadly described above in flow chart form and can be stored on any suitable electronic storage medium, e.g., a computer-usable medium. However, those skilled in the art will appreciate that the processes described above can be implemented in any number of variations and in many suitable programming languages without departing from the present invention. For example, the order of certain operations carried out can often be varied, and additional operations can be added without departing from the invention. Error trapping can be added and/or enhanced and variations can be made in user interface and information presentation without departing from the present invention. Such variations are contemplated and considered equivalent.

Various embodiments of the invention are thus described. While the present invention has been described in particular embodiments, it should be appreciated that the invention should not be construed as limited by such embodiments, but rather construed according to the below claims.

What is claimed is:

1. A method of processing data objects in a hand-held device, the method comprising:
   receiving a data object at the hand-held device;
   referencing a first database that associates the data object to a first application program;
   responsive to access of said data object, intercepting the data object before it is operated on by the first application program and instead associating the data object to a second application program,
   wherein the intercepting comprises referencing a second database that is a modified version of the first database, wherein the modified version associates the data object to the second application program;
   performing an operation on the data object using the second application program running on said hand-held device, wherein said operation was not previously performed on the data object; and
   based on a result of the operation, optionally operating on the data object using the first application program.

2. The method according to claim 1 further comprising:
   detecting installation of a new application program on the hand-held device;
   updating the first database to include the new application program: and
   updating the second database to associate a data object type with the new application program.

3. The method according to claim 1 further comprising the second application program passing the data object to the first application program.

4. The method according to claim 1 wherein the performing comprises performing a virus scan of the data object.

5. The method according to claim 4 further comprising:
   receiving a new virus definition; and
   updating a database of virus definitions used in the virus scan.

6. The method according to claim 1 further comprising generating a user notification.

7. The method according to claim 1 further comprising associating the data object to the first application program using information selected from the group consisting of: a creator's ID, a MIME type, and a file extension.

8. The method according to claim 1 wherein the performing comprises tracking usage of the hand-held device.

9. An article of manufacture comprising a computer-readable medium having computer-executable components for processing data objects in a hand-held device, the components comprising:
   a first application program and a second application program;
   a first database that associates an incoming data object to the first application program; and
   an interface that intercepts the data object before it is operated on by the first application program and instead associates the data object to the second application program; wherein after the data object is operated on using the second application program, the data object is optionally operated on using the first application program depending on a result of an operation using the second application program,
   wherein the interface references a second database that is a modified version of the first database, wherein the modified version associates the data object to the second application program.

10. The computer-readable medium according to claim 9 wherein the second application program directs the data object to the first application program.

11. The computer-readable medium according to claim 9 wherein the second application program performs a virus scan of the data object.

12. The computer-readable medium according to claim 9 wherein the second application program generates a user notification.

13. The computer-readable medium according to claim 9 wherein the second application program tracks usage of the hand-held device.

14. A hand-held device comprising:
   a processor;
   input means coupled to the processor for receiving a data object;
   a display screen coupled to the processor; and a memory coupled to the processor, the memory having stored therein computer-executable instructions that when executed cause the hand-held device to reference a first database that associates the data object to a first application program, intercept the data object before it is operated on by the first application program and instead associate the data object to a second application program that performs an operation on the data object, and based on a result of the operation, optionally operate on the data object using the first application program, wherein the computer-executable instructions cause the hand-held device to reference a second database that is a modified version of the first database, wherein the modified version associates the data object to the second application program.

15. The hand-held device according to claim 14 wherein the second application program directs the data object to the first application program.

16. The hand-held device according to claim 14 wherein the second application program generates a user notification.

17. The hand-held device according to claim 14 wherein the second application program tracks usage of the hand-held device.

* * * * *